United States Patent [19]
Karlsson

[11] Patent Number: 5,640,677
[45] Date of Patent: *Jun. 17, 1997

[54] BEST SERVER SELECTION IN LAYERED CELLULAR RADIO SYSTEM

[75] Inventor: Bror Åke Karlsson, Montreal, Canada

[73] Assignee: Telefonaktiebolaget LM Ericsson, Sweden

[*] Notice: The term of this patent shall not extend beyond the expiration date of Pat. No. 5,499,386.

[21] Appl. No.: 587,549

[22] Filed: Jan. 17, 1996

Related U.S. Application Data

[63] Continuation of Ser. No. 90,734, Jul. 9, 1993, Pat. No. 5,499,386.
[51] Int. Cl.$^6$ .............. H04B 7/26; H04Q 7/22; H04Q 7/36
[52] U.S. Cl. .......... 455/33.2; 455/33.4; 455/34.1; 455/54.2; 455/56.1; 379/60
[58] Field of Search ................ 455/33.1–33.4, 455/34.1, 34.2, 54.1, 54.2, 56.1, 67.1; 379/59, 67, 63

[56] References Cited

U.S. PATENT DOCUMENTS

| | | |
|---|---|---|
| 4,562,572 | 12/1985 | Goldman et al. . |
| 4,737,978 | 4/1988 | Burke et al. ................. 379/60 |
| 4,797,947 | 1/1989 | Labedz . |
| 5,067,147 | 11/1991 | Lee . |
| 5,111,534 | 5/1992 | Benner . |
| 5,134,709 | 7/1992 | Bi et al. . |
| 5,175,867 | 12/1992 | Wejke et al. ................ 455/33.1 |
| 5,317,623 | 5/1994 | Sakamoto et al. . |
| 5,499,386 | 3/1996 | Karlsson ..................... 455/33.2 |

FOREIGN PATENT DOCUMENTS

| | | |
|---|---|---|
| 0526436A1 | 6/1992 | European Pat. Off. . |
| 0562743A1 | 3/1993 | European Pat. Off. . |
| 5130018 | 5/1993 | Japan . |
| WO92/02105 | 6/1992 | WIPO . |
| WO92/12602 | 7/1992 | WIPO . |

*Primary Examiner*—Chi H. Pham
*Attorney, Agent, or Firm*—Jenkens & Gilchrist, P.C.

[57] ABSTRACT

A multi-level layered cellular radio architecture serves mobile subscriber stations moving within the system. Best server selection is performed for the mobile stations by assigning within each cell a preference value to each other one of the cells with which is associated by proximity of service area. The strength of the radio signal received by the mobile from the serving cell as well as the radio channels of associated cells is measured. A decision as to the best serving cell for the mobile station is made based upon both the preference value of the associated cells and the signal strength of their respective radio channels.

20 Claims, 9 Drawing Sheets

BEST SERVER SELECTION IN LAYERED CELLULAR RADIO SYSTEM

This application is a continuation of application No. 08/090,734, filed Jul. 9, 1993, now U.S. Pat. No. 5,499,386.

BACKGROUND OF THE INVENTION

1. Field of the Invention

The invention relates to handoff of mobile stations within cellular radio systems and, more particularly, to handoff within layered cell structures of such systems.

2. History of the Related Art

In cellular radio communication systems a geographic area is divided into a plurality of individual regions referred to as cells, each of which is provided with radio service on a plurality of separate RF channels the frequencies of which are reused among different cells sufficiently separated from one another that there is a sufficiently low level of interference between them. When a mobile station receiving radio service from a particular base station serving a particular cell moves from that cell into another adjacent cell, communication with the mobile station is "handed off" from the first base station to the second base station serving the adjacent cell. Such handoff is accomplished by a mobile switching center (MSC) to which all of the base stations are connected and which controls the allocation of communication channels to the individual mobiles moving throughout the region served by the cells.

As the demand for cellular radio service increases over time, the capacity of existing systems has been severely stressed to serve all the subscribers who would like to have access to the system, particularly in major metropolitan areas. To address this demand, cellular radio technology is currently moving from analog based systems, in which each subscriber communication channel is allocated to a single radio channel, to digital based systems in which a plurality of subscriber channels can be assigned to each radio channel through time division multiple access (TDMA) radio technology. In TDMA radio, each radio channel is divided into a plurality of time slots and a digitized portion of each subscriber's conversation is broadcast in an assigned time slot. However, even with such improvements in channel capacity, there exist certain areas within major metropolitan areas in which the demands on the system are so great that it cannot be successfully satisfied by existing cellular radio architectures. For example, in the area in and around a convention center located in a major metropolitan area, the channel usage by portable cellular radio transceivers may be so great that the demands for service cannot be satisfied by the entire channel capacity of the base station serving the cell within which the convention center is located. In such situations, it has been proposed to provide additional "layers" of cellular radio coverage provided by additional lower powered base stations located within an existing, so-called "umbrella" cell and referred to as "microcells" Such microcells may have a coverage or service area on the order of a few hundred meters in contrast to a few kilometers of coverage by the base station of the overlying umbrella cell. A plurality of such microcells may be located adjacent to one another and form a contiguous coverage area of substantial width all of which is within the overall coverage area of the umbrella cell.

When a layered cell structure, as described above in conjunction with umbrella cells and microcells, is used there is provided an enhanced level of radio capacity which can be configured for individual circumstances and which provides an assurance that users can receive service despite an extremely high demand within a very small geographic area. Moreover, additional layers of radio coverage may be added, for example, by a plurality of either contiguous or separated "pico cells" positioned within the coverage or service area of the individual microcells, each of which are in turn within the overall umbrella cell. The base stations providing the radio coverage within the pico cells would be of even still lower power than the base stations serving the microcells and have a coverage or service area of, for example, a hundred meters to provide coverage within a single building or a single floor within a large convention center.

Thus, in layered cell architectures, the issue of server selection and handoff of each mobile radio transceiver moving within a geographic area involves many more options. That is, it is possible for the mobile station to receive radio service at any given moment from either a pico cell base station, a microcell base station, or an umbrella cell base station. When conventional handoff criteria used in single layered cellular architectures are applied to this situation, problems arise and the solution is less than ideal. The ability to configure the handoff arrangement for maximum efficiency with respect to the utilization of channel availability and consistent with high quality radio service to each mobile subscriber is highly desirable.

When handoff is effected between adjacent cells in a single layer cellular radio architecture, the principle criterion used is the quality of the signal received from the mobile station by the respective base stations capable of providing radio service. That is, the quality of the signal received from the mobile station by the base station currently serving the mobile is compared with the quality of signal received by a base station serving an adjacent cell and when the quality of signal in the latter exceeds the former, the mobile is handed off to the base station serving the adjacent cell. In addition, a signal quality increment, known as an offset or hysteresis, is also applied to the signal quality difference value so that unless the signal quality in the adjacent base station is at least "x" amount greater than the presently serving base station, handoff does not occur. This prevents oscillating handoffs due to signal quality perturbations in which the mobile is repeatedly handed back and forth between two adjacent base stations.

When conventional handoff techniques, based purely upon signal quality, are applied to the multiple layer cellular architecture, the resulting service quality is often not optimal and in many cases totally inappropriate. This is because it is generally preferable to serve a mobile station with the lowest possible level of base station as a preferred service provider primarily because of capacity reasons. That is, if sufficient signal quality exists from the microcell, it is preferred to serve the mobile from that cell rather than handing the mobile off to the umbrella cell which has fewer total channels available for service than a plurality of adjacent microcells would have.

Because of the foregoing problems associated with the use of existing handoff algorithms within layered cellular architectures, it is desirable to introduce a system of handoff algorithms which maximize the efficient utilization of channel availability within a multi-level cellular radio architecture. The system of the present invention provides such a technique.

SUMMARY OF THE INVENTION

In one aspect of the invention, a mobile station is served by the base station of the cell level which is the preferred service provider for that mobile as long as the signal quality is above a selected minimum value. Should the signal quality deteriorate below that selected minimum value, best server selection possibilities are evaluated on the same level and such possibilities are first exhausted before handoff is made to a cell on a lower preference level.

In another aspect of the present invention, handoff is performed of a mobile station operating within a cellular radio system in a region in which radio channels are provided by multiple levels of cells having different service areas. Categories of preference are assigned within each cell with respect to each other associated cell within the system as to which said cell's service area is either adjacent, contiguous, or overlapping. The signal strength of the radio signals providing communication between the mobile station and the base station serving each of the associated cells within the system is measured and compared to a preselected threshold value. Whether or not to handoff the mobile to a base station serving an associated cell is determined based upon whether the signal strength of the radio signal therefrom is greater than the threshold value and on the preference assigned to the associated cell.

In a still further aspect of the invention, best server selection is performed for a mobile station served on a first radio channel by a first base station serving a first cell and operating within a cellular radio system in a region in which radio channels are provided by multiple levels of cells having different service areas. Categories of preference are assigned within each cell with respect to each other associated cell within the system as to which said cell's service area is either coextensive adjacent, contiguous, or overlapping. Each associated cell is assigned a category of preferred, equal preference or non-preferred based upon the size of its service area relative to that of the cell within which the assignment is made. Information on a second radio channel broadcast by a second base station serving a second associated cell is received and stored. The signal strength of the radio signals broadcast on the first and second radio channels, respectively, are measured. The preference category of the cell from which said second radio channel signal is received is determined. The second base station broadcasting the second radio channel is selected as the best server in response to any one of the following conditions, (a) the second cell having a preference category of preferred and the signal strength of the radio signal of said second radio channel being greater than a preselected value, (b) the second cell having a preference category of equal preference and the signal strength of the radio signal of the second radio channel being greater than the signal strength of the radio signal of the first radio channel, or (c) the second cell having a preference category of non-preferred and the signal strength of the first radio channel being less than a preselected value and the signal strength of the radio signal of the second radio channel being greater than that of the first radio channel.

In yet another aspect of the invention, server selection is performed for a mobile station operating within a cellular radio system in a region in which radio channels are provided by multiple levels of cells. Each of the cells is provided with radio service by a base station the broadcast power of which and the resultant service area of which varies from larger to smaller. Each cell is provided with a list of neighboring cells the service areas of which are proximately associated with the service area of the cell. A minimum acceptable radio channel signal strength value is assigned for each cell. The strength of the radio signals providing communication between the mobile station and the base station is measured for the cell currently serving the mobile station as well for each of the neighboring cells thereof. A server is selected for the mobile station from among the currently serving cell and its neighboring cells by choosing the cell having both the smallest service area and a radio signal strength which is at least equal to the minimum acceptable value.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION OF THE PREFERRED EMBODIMENT

Figure 1:
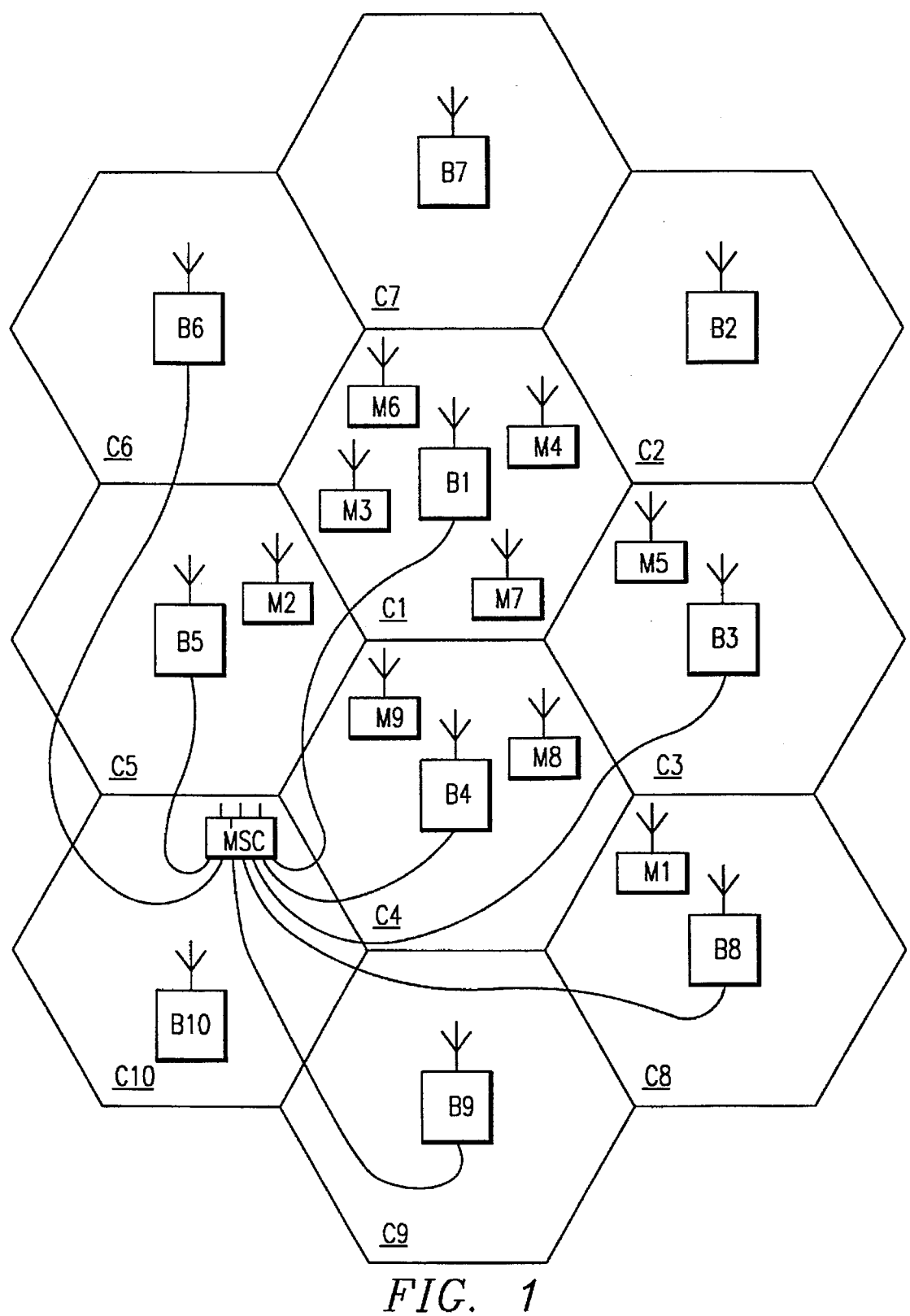
FIG. 1 is a pictorial representation of a single level cellular radio communication system including a mobile switching center, a plurality of base stations and a plurality of mobile stations.

Referring first to FIG. 1, there is illustrated a conventional single layer cellular radio communication system of the type to which the present invention has a relationship. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, receiver, and base station controller as is well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration of a single level cellular radio system only and is not intended as a limitation on the possible implementations of the cellular radio system within which the system of the present invention may find utility.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 will be found in some the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and even from one cellular radio system served by an MSC to another system.

Each of the mobile stations M1–M10 is capable of initiating or receiving a telephone call via one or more of the base stations B1–B10 and a mobile switching center (MSC). A mobile switching center (MSC) is connected by communication links, e.g., cables, to each of the illustrative base stations B1–B10 and to the fixed public switch telephone network (PSTN), not shown, or a similar fixed network which may include an integrated system digital network (ISDN) facility. The relevant connections between the mobile switching center (MSC) and the base stations B1–B10, or between the mobile switching center (MSC) and the PSTN or ISDN, are not completely shown in FIG. 1 but are well known to those of ordinary skill in the art. Similarly, it is also known to include more than one mobile switching center (MSC) in the cellular radio system and to connect each additional mobile switching center (MSC) to a different group of base stations and to other mobile switching centers (MSCs) via cable or radio links.

Each of the cells C1–C10 is allocated a plurality of voice or speech channels and at least one access or control channel, such as a forward control channel (FOCC). The control channel is used to control or supervise the operation of mobile stations by means of information transmitted to and received from those units. Such information may include incoming call signals, outgoing call signals, page signals, page response signals, location registration signals, voice channel assignments, and maintenance instructions as the mobile station travels out of the radio coverage of one cell and into the radio coverage of another cell. The control or voice channels may operate either in an analog or digital mode or a combination thereof.

FIG. 1 illustrates a relatively conventional single level cellular structure in which mobile stations are handed off from one cell to another by it being served with radio channels in communication with first one base station and then an adjacent base station based upon the signal level of the mobile station received from each of the respective base stations.

Figure 2:
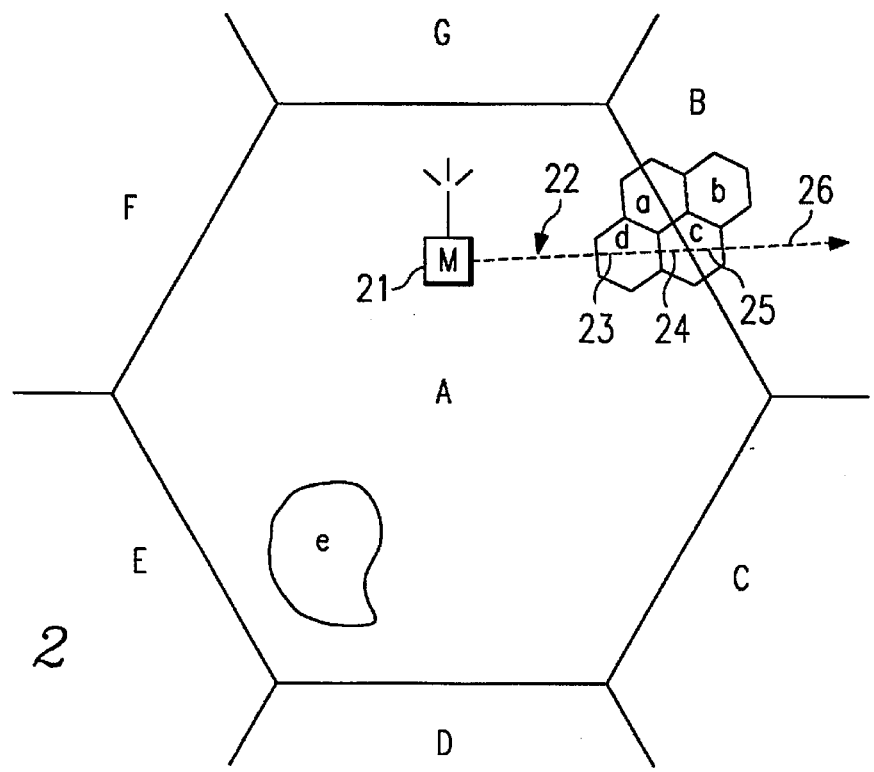
FIG. 2 is a pictorial representation of a multilevel cellular radio communication system illustrating a plurality of microcells and a plurality of overlying umbrella cells.

Referring next to FIG. 2, there is shown an illustrative multi-level layered cellular architecture in which a plurality of umbrella macrocells A–G, analogous to the cells C1–C10 of FIG. 1, overlie and include a plurality of microcells a–e located within the same service area of one or more of the umbrella cells. In FIG. 2, each of the umbrella cells A–G would be served respectively by a base station, similar to the base stations B1–B10 of FIG. 1, and it would include a service area within a cell on the order of, for example, several kilometers in diameter. Similarly, each of the microcells a–e would also be served by a base station (not shown) located within the cell and providing a respective service area on the order of a few hundred meters for each. Just as the service areas of the umbrella cells A–G are adjacent, contiguous or overlapping to one another, so also are the service areas of the respective microcells a–d contiguous to one another, with the service area of microcell e being isolated from the other microcells but coextensive within the service area of the umbrella cell A. Each of the base stations providing radio coverage for both the umbrella cells A–G and the microcells a–e could be operated under the control of a single MSC (not shown).

As shown in FIG. 2, a mobile station 21 moving along the path identified by arrow 22 would move from the region served by umbrella cell A through the regions served by microcell d and microcell c and into the coverage area of umbrella cell B. Providing radio service to the mobile station 21 as it moves along the path 22 could involve a number of different handoffs from different serving base stations at different points along the way depending upon the handoff criteria or handoff algorithm used to implement such handoffs. For example, at the beginning of its path, the mobile station 21 could only be provided with service by the base station serving the umbrella cell A, while at point 23 along the path 22 it could be served either by the base station of umbrella cell A or the base station of microcell d. In addition, when it reached point 24 on the path 22, it could be served either by the base station of umbrella cell A or the base station of microcell c. Further, at point 25, service could be provided by the base station of microcell c or the base station of umbrella cell B. Finally, at point 26 on path 22, the mobile station 21 could only be provided with service by the base station serving umbrella cell B. Thus, the decision criteria with respect to which cell the mobile station 21 should be handed off to and the criteria which should be used to determine both the timing and the result of that handoff are important considerations in configuring the efficiency and capacity of radio service to be provided to the mobile stations within the multi-layered cellular structure of FIG. 2.

As discussed above, in implementing the handoff process within a single layer cellular structure, a mobile station is only located in one cell at a time and leaves the old cell behind when it enters and begins receiving service by virtue of handoff to the new cell. In such case, the signal strength received from the mobile station decreases for the old cell and increases for the new cell when the handoff border is crossed by the mobile station. However, when a microcell is placed within an umbrella cell and is totally surrounded by the umbrella cell, there is an entirely different situation with respect to the variation in signal strength as the mobile moves through the microcell located within the umbrella cell. For example, if the handoff border for a microcell on the reverse side from the umbrella cell is crossed, both the serving cell signal strength and the candidate cell signal strength are increasing or decreasing, depending upon the direction of movement of the mobile station. This variation in signal strength becomes more and more of a problem the closer to the antenna site serving the umbrella cell site the microcell is located. These problems may be illustrated by two examples set forth below, both for digital radio channels.

Figure 3:
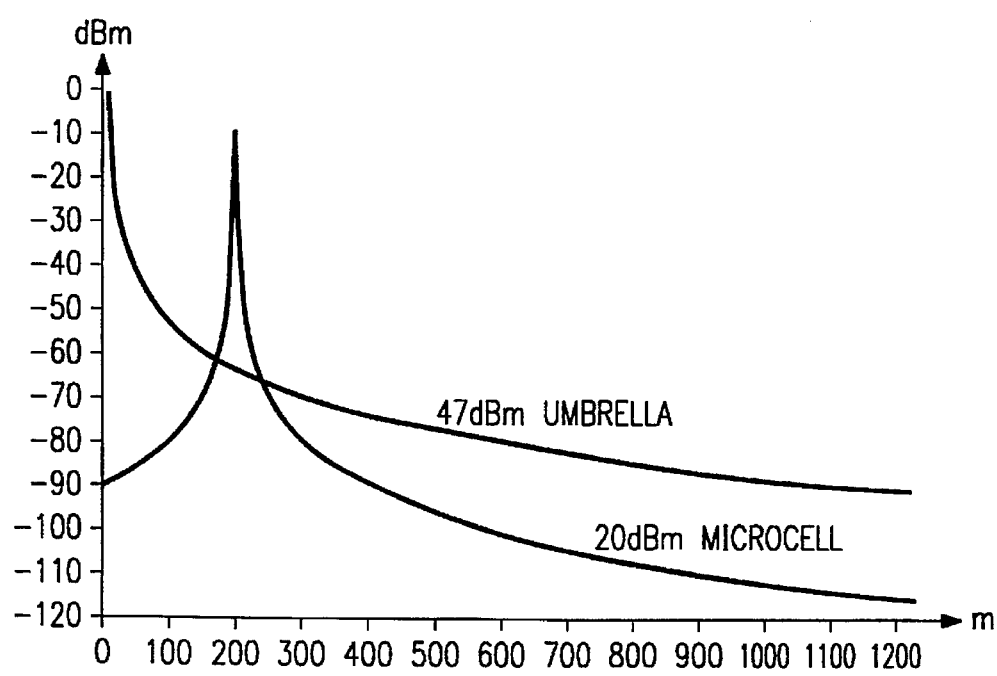
FIG. 3 is a graph illustrating received signal strength by a mobile station moving within a microcell and an overlying umbrella cell within which it is included.

In the first example, assume that an umbrella cell has 50 watts erp (47 dbm) and an enclosed microcell 0.1 watt erp (20 dbm). The microcell is placed 200 meters from the base station site of the umbrella cell. 0.1 watts is an appropriate power level for a 200 meter diameter microcell. As shown in FIG. 3, there is illustrated the calculated signal strength received by a mobile station using the formula $L=30+35\log d$ as the path loss formula, with d being given in meters. In addition, in an attempt to have an appropriate cell size, a signal offset value is set to 10 db, i.e., 10 db is subtracted from the measured umbrella cell signal strength before comparison to candidate cell signal strength in accordance with standard single level cell architecture handoff algorithms. As illustrated, the signal strength of the signal received by a mobile station from the umbrella cell moving from the base station location of the umbrella cell toward and through the base station site of the microcell, begins quite high and decreases exponentially as a function of the distance between the mobile station and the umbrella cell base station. The signal strength received by the mobile station from the microcell increases exponentially until it passes through the base station serving the microcell at 200 meters distance from the base station of the umbrella cell and then decreases exponentially thereafter as a similar function of the distance from the microcell base station.

Figure 4:
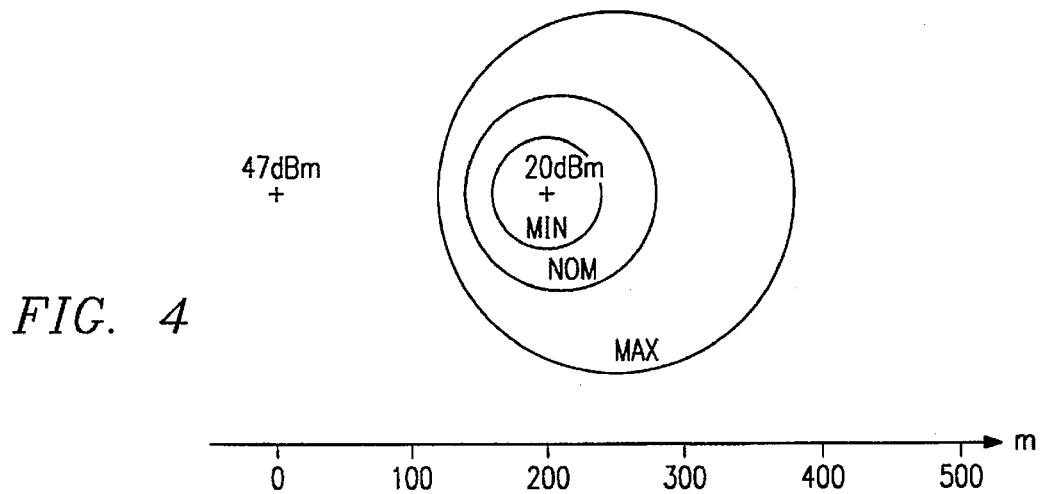
FIG. 4 is a diagram of nominal minimum and maximum microcell sizes.

Referring next to FIG. 4, there is shown the nominal handoff border with an offset value of 10 db being applied when the signals are compared, meaning that the nominal handoff border is the line where the umbrella cell is 10 db stronger than the microcell. Adding a plus or minus 5 db inaccuracy in the mobile assisted handoff (MAHO) measurement by the mobile station and a ±3 db hysteresis, the maximum and minimum cell size is found where the umbrella cell is 18 db and 2 db stronger, which are shown by the inner and outer line of FIG. 4, respectively. The lowest signal strength in the microcell is found to be around −97dbm. Such a case may work and might be acceptable in some cases, however, the uncertainty of the handoff borders is relatively high. Moreover, if some fading is introduced into the consideration of signal level, such a technique is likely to become unacceptable from a practical standpoint. These uncertainties in handoff borders will be even worse if fading is added to the signal strengths. Without any offset at all, the cell is much too small considering the ability to provide coverage with 20 dbm output power.

Figure 5:
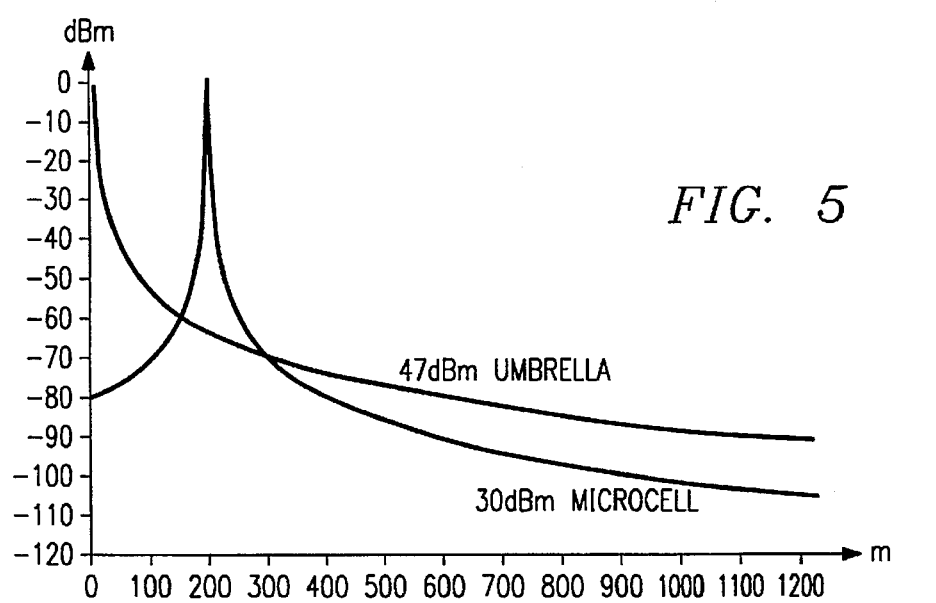
FIG. 5 is a graph illustrating received signal strength by a mobile station moving within a microcell and an overlying umbrella cell with different signal criteria than in FIG. 3.
Figure 6:
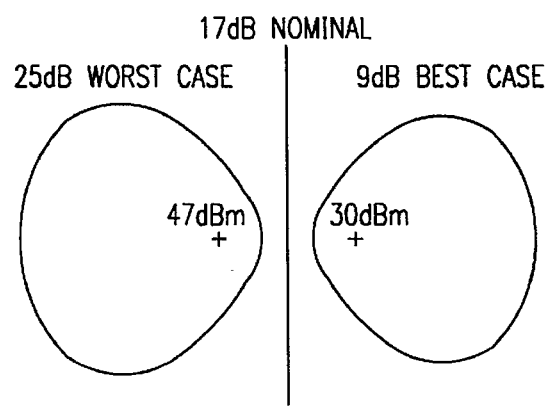
FIG. 6 is a diagram illustrating three different handoff borders for a microcell and an overlying umbrella cell.

A second example of the problems associated with using the conventional single layer handoff algorithm for a multi-layer cellular structure, may be illustrated with the case of 200 meters between two separate cell sites but with 30 dbm for the micro cell. In this case, the difference was that the microcell had 30 dbm output power. FIG. 5 is a graph showing the signal strength from the two cells at the different distances from the respective base station of the umbrella cell and the microcell as the mobile travels from the base station of the umbrella cell through the base station of the microcell and then away from both. While the overall structure of the respective signal level curves is similar to that shown in FIG. 3, the overlapping relationship is somewhat different. Moreover, if a nominal offset value is selected to be 17 db, the nominal handoff border, i.e., the line where the umbrella signal strength is 17 db higher than that of the microcell signal strength, is represented by the straight line in FIG. 6. As discussed above, inaccuracies in the mobile and hysteresis values are added giving borders at 9 db and 25 db offsets, respectively. In this case, the umbrella cell and the microcell are equivalent. In the worst case, the umbrella cell is the small one and in the best case the microcell is the small one. This example illustrates what can easily happen if the offset is set too high in an attempt to get a reasonable coverage.

The above two examples illustrate that there are cases where the existing locating function and handoff algorithm gives highly inappropriate results in the case of multi-level cellular structures. Attempts to address these inadequacies may include: (1) providing design rules to be followed by cellular system operators to avoid dangerous situations; and (2) modification of the locating algorithms to better handle the umbrella/microcell situation. The use of design rules is not an acceptable approach since rules must define restrictions on microcell power levels and distances from the umbrella cell site. Such rules have to include a considerable margin of error in order to cover nominal situations and will be perceived as a limitation on the operation of the system. In addition, if the rules are not followed, either deliberately or accidentally, the system will be perceived to have a lower quality with degraded voice quality and more dropped calls leading to system complaints.

As pointed out above, the present algorithm used in the case of single level cellular structures functions adequately to use relative signal strength between current cells and neighboring cells in order to locate handoff borders when the cells are of equal preference and located side by side. Another criterion is needed for handoff between umbrella cells and microcells.

The system of the present invention provides handoff criterions based on absolute signal strength. That is, when the serving cell is the umbrella cell and the signal strength for a microcell neighbor, measured by the mobile station in digital cellular systems and by the signal strength receiver in analog cellular systems, is above a "sufficient" signal level, so as to ensure a good speech quality in the microcell, a handoff can be made to the microcell. This criterion ensures that a handoff to the microcell is performed whenever it can give service of sufficient quality.

A general approach inherent in the system of the present invention is to handle each of the cells as belonging to distinctly different layers, i.e., macrocells, microcells, pico cells, etc., without defining different layer types. In order to achieve, for example, three categories of neighboring cells: (1) neighbors beside, (2) neighbors above, and (3) neighbors below, such a classification is useful. In such a definition, a "neighbor beside" will be an existing neighbor on the same level as the currently serving cell. Neighbors above for a microcell would be an umbrella cell and neighbors below for an umbrella cell would be microcells.

Under the present system, handoff should be accomplished to a neighbor below whenever the signal strength in that neighbor is above a new "sufficient" threshold value to be defined as a cell parameter. On the other hand, handoff to a neighbor above, for example, the umbrella cell, should only be done when the signal strength is below the same threshold provided that it is a better candidate. A hysteresis value will be applied to the threshold in order to avoid oscillating handoffs.

The modification of the handoff criteria employed in the application of the present invention to one exemplary implementation of a cellular radio system, the CMS 88 system of Ericsson Radio System, has an impact on both the exchange and the base station software in that in the exchange software handling of new cell parameters and neighbor type information must be added. Such new cell parameters and neighbor type information are sent by the exchange to the base station and, in the base station, these parameters must be added to the digital channel software as new criteria for sending handoff requests. In the case of analog channels, such corresponding software criteria must be located in the exchange itself.

To be more general, there are two different methods implied in best server selection in accordance with the present invention: (a) Analog, in which the signal strengths for each call are measured in the neighbor cells, and these together with the signal strength for uplink in the serving channel are evaluated; and (b) Digital in which mobile assisted handoff (MAHO) is employed and similar measurements are made by the mobile and reported to the base station and evaluated.

A basic concept inherent in the present invention is that it is desirable to serve a mobile station by means of a cell level within a multi-cell structure which is at the lowest possible level provided the signal quality is sufficient to provide good service. In the situation shown in FIG. 2, including an array of umbrella cells and microcells positioned therein, and in which it possible to provide coverage from either the umbrella cell or the microcell, it is normally optimal to allow the microcell to handle the subscriber traffic whenever it is appropriate from the standpoint of quality transmission. In other words, in such situations the microcell, i.e., the lowest level of cells in the multi-cell array, is preferred. In the case where multi-cell levels are implemented, one layer is generally preferred over the other primarily for capacity reasons.

The system and method of the present invention is implemented based upon the processing of a list of neighbor cells and upon the differentiation between preferred cells, non-preferred cells and cells with equal preference in order to ascertain the most appropriate serving cell both at time of call setup as well as during the call itself. For example, as shown in FIG. 2, the microcells a, c, d, e are preferred to the umbrella cell A, microcells a, b, c are preferred to the umbrella cell B, while umbrella cells A–G have equal preference to each other and microcells a–e have equal preference to each other.

Within the present system, one goal is to ensure that the mobile subscriber radio transceiver is tuned to the most appropriate cell both during the idle mode as well as during the call process. Preferably, the algorithm used in the present invention is employed to select a cell which is the same in both mode idle and during the process of a call in order to make sure that the cell as selected at call setup is also accepted immediately after the call setup.

In the present invention, data are assigned to each cell as set forth below in the chart.

| Parameter | Description |
| --- | --- |
| 1 | A selected signal strength threshold which defines a sufficiently "acceptable" signal strength for the cell |
| 2 | A hysteresis value to be used together with the assigned threshold |
| 3 | A list of neighboring cells |
| 4 | For each neighbor, an assigned type, i.e., preferred, non-preferred, equal preference |
| 5 | For each neighbor, an assigned hysteresis value |

In case there is no qualified preferred neighbor and the signal strengths in the currently serving cell is below the threshold, then the "best" cell should be selected and handed off to. The hysteresis value of parameter 5 is used in this particular situation.

Figure 7:
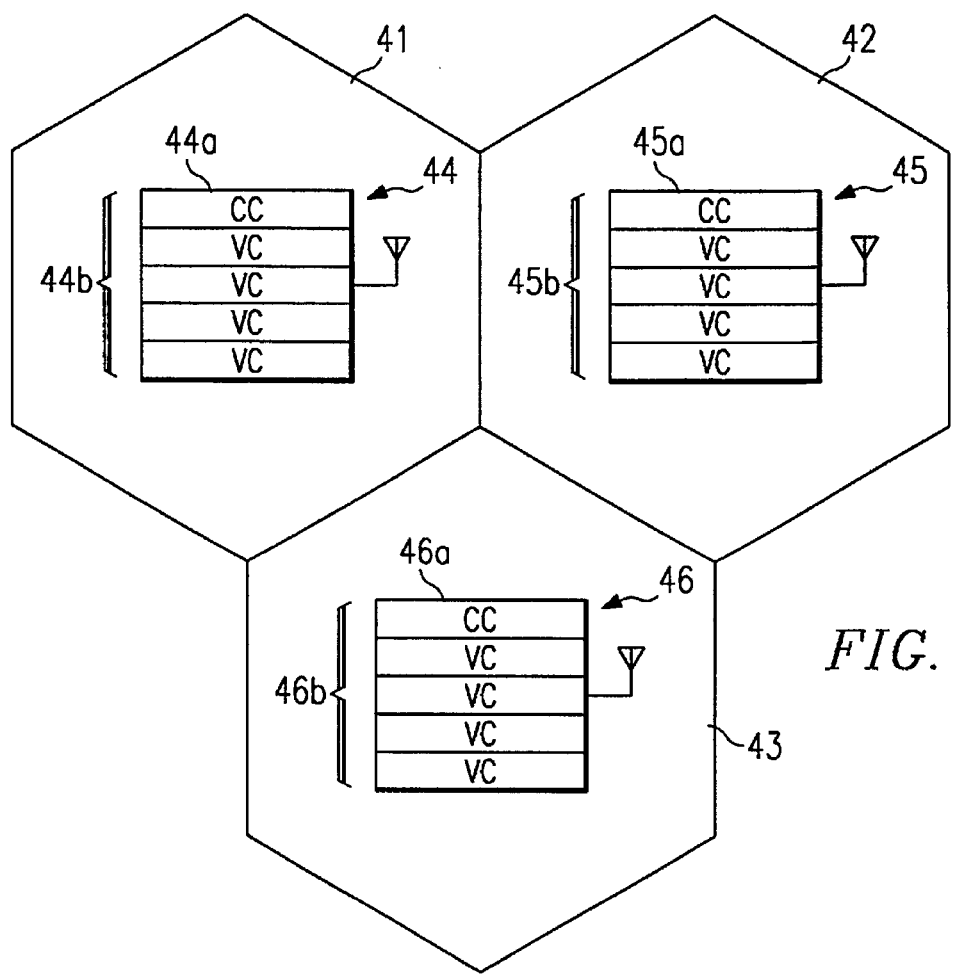
FIG. 7 is a block diagram illustrating a plurality of base stations located respectively within adjacent cells of a cellular radio system.

Referring briefly to FIG. 7, there is shown a plurality of neighboring cells 41–43 which may be at any level within a multi-level cellular structure. Within each cell is a base station 44–46 each of which comprises a control channel transceiver 44a–46a as well as a plurality of voice channel transceivers 44b–46b. The control channel of the base station is used for communication with mobile stations during idle period when no call has been established. The signalling placed on the control channel includes the information to be broadcast to the mobile stations relating to neighboring cells. The voice channels are used after call setup to a mobile station and carry not only voice data but also certain signalling, for example, measurement channel numbers for the neighboring cells to the cell serving the mobile station, as well as a handoff order to the mobile and measured signal strength from the neighboring cells to the cell serving the mobile station in the case of mobile assisted handoff (MAHO) under the IS-54 digital standard.

Figure 8:
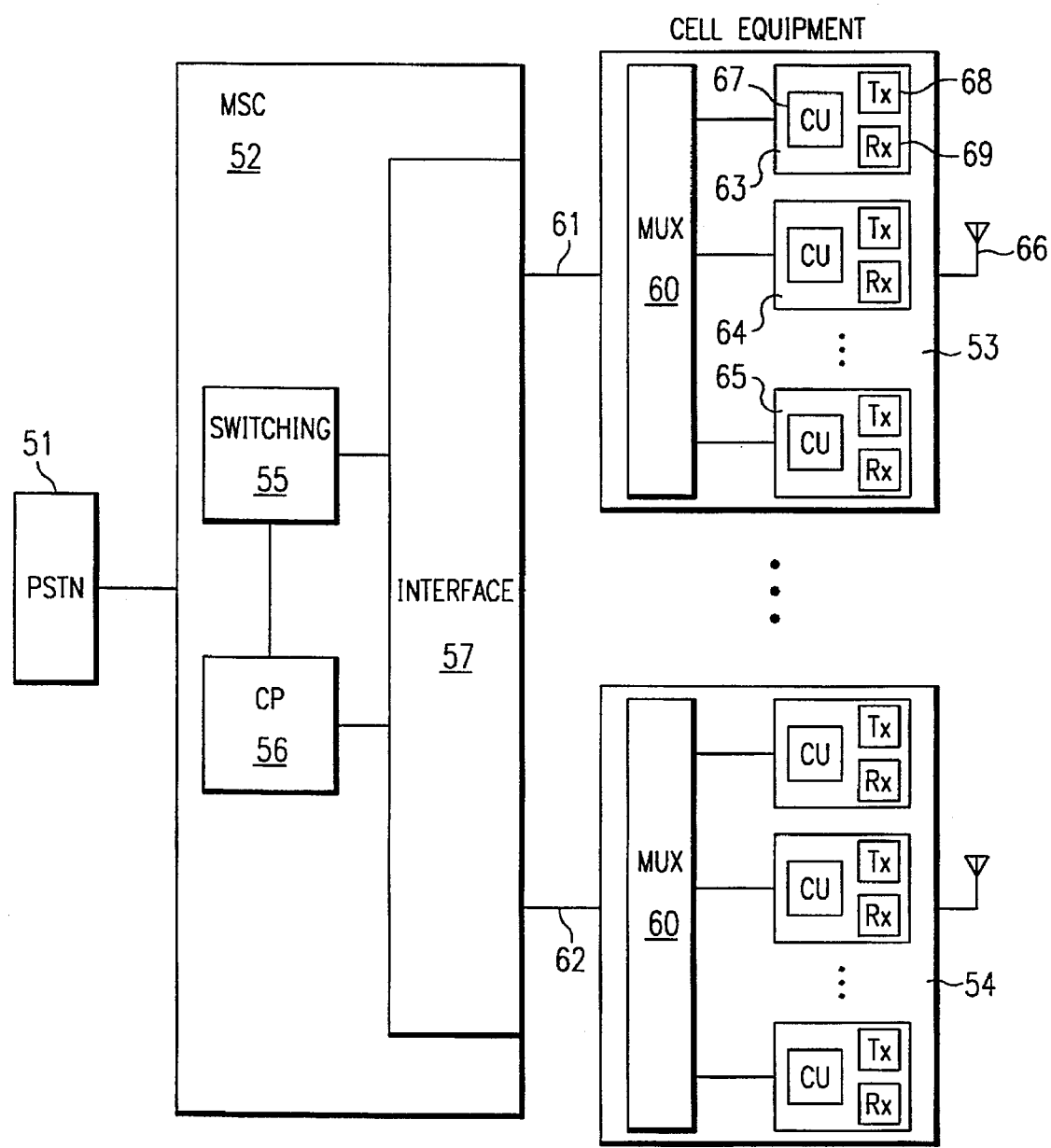
FIG. 8 is a block diagram of the infrastructure equipment within a cellular radio system.

Referring now to FIG. 8, there is shown an overall block diagram of the equipment within the cellular network within which the present invention is incorporated, including the public switched telecommunication network (PSTN) 51, a mobile switching center (MSC) 52, and a pair of illustrative base stations 53–54. Within the MSC 52 is a switch 55 controlled by a central processor 56 both of which are connected to an interface 57. The interface 57 of the MSC 52 is coupled by means of data lines 61 and 62 to each of the respective base stations 53 and 54. Each base station includes a multiplexer/demultiplexer 60 connected to a plurality of transceivers 63–65 connected to an antenna 66. Each transceiver includes a control unit 67 and a transmit unit 68 along with a receive unit 69. Calls to or from subscribers in the PSTN 51 are connected to the switch 55 within the MSC 52 where they are routed to the correct cell and voice channel controlled by the central processor 56. The central processor 56 also administers and processes data regarding the location of the mobile, the neighboring cells to the cell within which the mobile is currently located, and control both call setup and handoff. The links between the MSC 52 and the base stations 53 and 54 (links 61 and 62) carries voice data, as well as control information to and from the control unit 67 within each of the different transceivers 63–65 of the base stations 53 and 54. The base station equipment 53 and 54 consists of the multiplexer 60 which administrates distribution of voice data and control information to and from the different transceivers 63–65. The transceivers include both control channel transceivers and voice channel transceivers.

Figure 9:
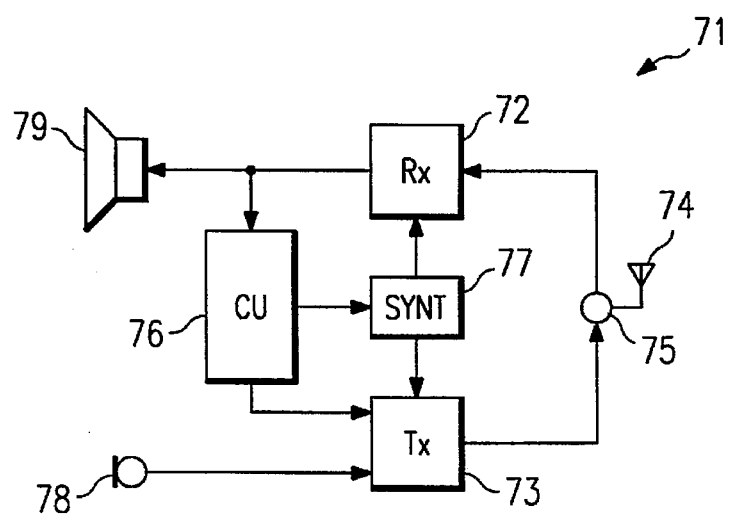
FIG. 9 is a block diagram of a mobile radio transceiver for use within a cellular radio system.

Referring next to FIG. 9, there is shown a mobile subscriber unit 71 including a receiver 72, a transmitter 73 connected to an antenna 74 through a duplexer 75. A control unit 76 is coupled to a synthesizer 77 which is also coupled to the transmitter 73 and receiver 72. A microphone 78 is connected to the transmitter 73 while a speaker 79 is connected to the receiver 72. The synthesizer 77 is used to tune the receiver 72 to the control channel frequencies before call setup and to different voice channel frequencies and measurement channel frequencies during the call and under control of the control unit 76. The control unit 76 measures by means of the receiver 72 and the synthesizer 77 the signal strength of the signal being received by the receiver 72, receives neighbor list information from the base station via the receiver 72 and processes all of the information according to the algorithm and technique of the present invention.

In the present system a mobile unit in idle mode searches the assigned frequency spectrum being broadcast for an appropriate control channel for communication with the cellular network. All control channels are continuously transmitting and are cyclically broadcasting neighbor cell information which is valid for the cell within which the mobile is currently located. The neighbor cell information consists of the following data:

1) Control channel frequencies for the neighbor cells;
2) The type of neighbor, i.e.
   (a) Preferred neighbor,
   (b) Non-preferred neighbor, or
   (c) Neighbor with equal preference;
3) For preferred neighbors, a signal strength threshold value for each. This threshold value is the threshold of sufficient signal strength in the neighbor cell plus a corresponding hysteresis or offset value, which may be calculated in the central processor in the MSC or in the control unit of the base station before it is sent;
4) For each control channel (cell), a signal strength threshold which is the threshold for sufficient signal strength when served by the cell, i.e., preferred, cell but this time with the hysteresis value subtracted from that value; and
5) For all neighbors (with equal preference and for non-preferred neighbors) a hysteresis value.

The mobile station measures the signal strength periodically for the current channel and at the frequencies defined for the current cell's neighbors. The mobile then tunes to a preferred neighbor as soon as the measured signal strength for this neighbor is above the threshold set for this neighbor cell. If more than one preferred neighbor is qualified, the mobile tunes to the neighbor with the best margin with respect to the threshold value. If, however, there is no qualified preferred neighbor cell and a neighbor cell with equal preference has a signal strength which is higher than the signal strength to the current channel with a margin which is defined by the hysteresis value for that particular neighbor, the mobile then retunes to this neighbor cell.

If the signal strength for the current channel is below its threshold defining sufficient signal strength and there is no qualified preferred neighbor and there is also no qualified neighbor with equal preference, and a non-preferred neighbor has a signal strength which is higher than the signal strength for the current channel with a margin also added which is defined by the hysteresis value for that particular neighbor cell, the mobile tunes to this neighbor cell's control channel frequency.

When a call setup from the mobile is attempted, the mobile is already on an appropriate control channel according to the procedure set forth above and the call can be set up in the corresponding cell according to the well-established procedures.

Another way to provide the mobile with the frequencies, the neighbor types, two signal strength levels, i.e., the threshold and the hysteresis, and another hysteresis would be to broadcast the threshold and the hysteresis separately and let the mobile calculate the two levels.

Another way to describe the algorithm is: (1) tune to a preferred neighbor when the measured signal strength is "good enough"; (2) do not tune to a non-preferred neighbor when the measured signal strength for the currently serving cell is "good enough"; and (3) tune to the best neighbor when the signal strength for the serving cell is not "good enough".

As an illustration of the above-referenced procedure, an example may be set forth with reference to FIG. 2. A mobile subscriber terminal moving from umbrella cell A to umbrella cell B will first be tuned to cell A's control channel frequency where it will receive broadcast information regarding control channel frequencies for neighboring cells B–G with equal preference as well as their hysteresis values together with the frequencies for the preferred neighbor microcells a, b, d, e and their corresponding threshold values. When the signal strength from microcell d is above the threshold value set for that cell, the mobile will retune to microcell d's control channel and receive information about microcell d's neighbor cells which are now microcell a and microcell c with equal preference, and umbrella cell A as a non-preferred neighbor cell. After having retuned to microcell c, the neighbors with equal preference will be microcell a, microcell b, and microcell d and the non-preferred neighbors will be umbrella cell A and umbrella cell B. Finally, when the mobile station has reached a location within umbrella cell B, it will have umbrella cells A, C and G as neighbors with equal preference and microcells a, b, c as preferred neighbors.

When a call is in progress within the system of the present invention and just after call setup and after handoff to a new cell, information about the control channel frequency or any other continuously transmitting frequency in each neighbor cell is sent to the mobile station. The mobile measures signal strength for the serving channel and the neighboring cells periodically and reports those values on the current voice channel to the base station. This information is processed in the control unit of the base station or in the central processor of the MSC according to precisely the same rules as was done in the mobile station during idle condition. As soon as a better serving base station is identified according to rules set forth above, a handoff is performed to this new serving base station. If the base station or the mobile station uses power regulation, the signal strength or the threshold must be adjusted in order to get a comparison result, as if the radio transmitter was using the maximum allowed power level in the cell.

The system of the present invention provides an easier and more natural way to control selection of a cell at call setup and at handoff. The system also provides a system for optimal cell selection within such a multi-layered cell structure.

Figure 10:
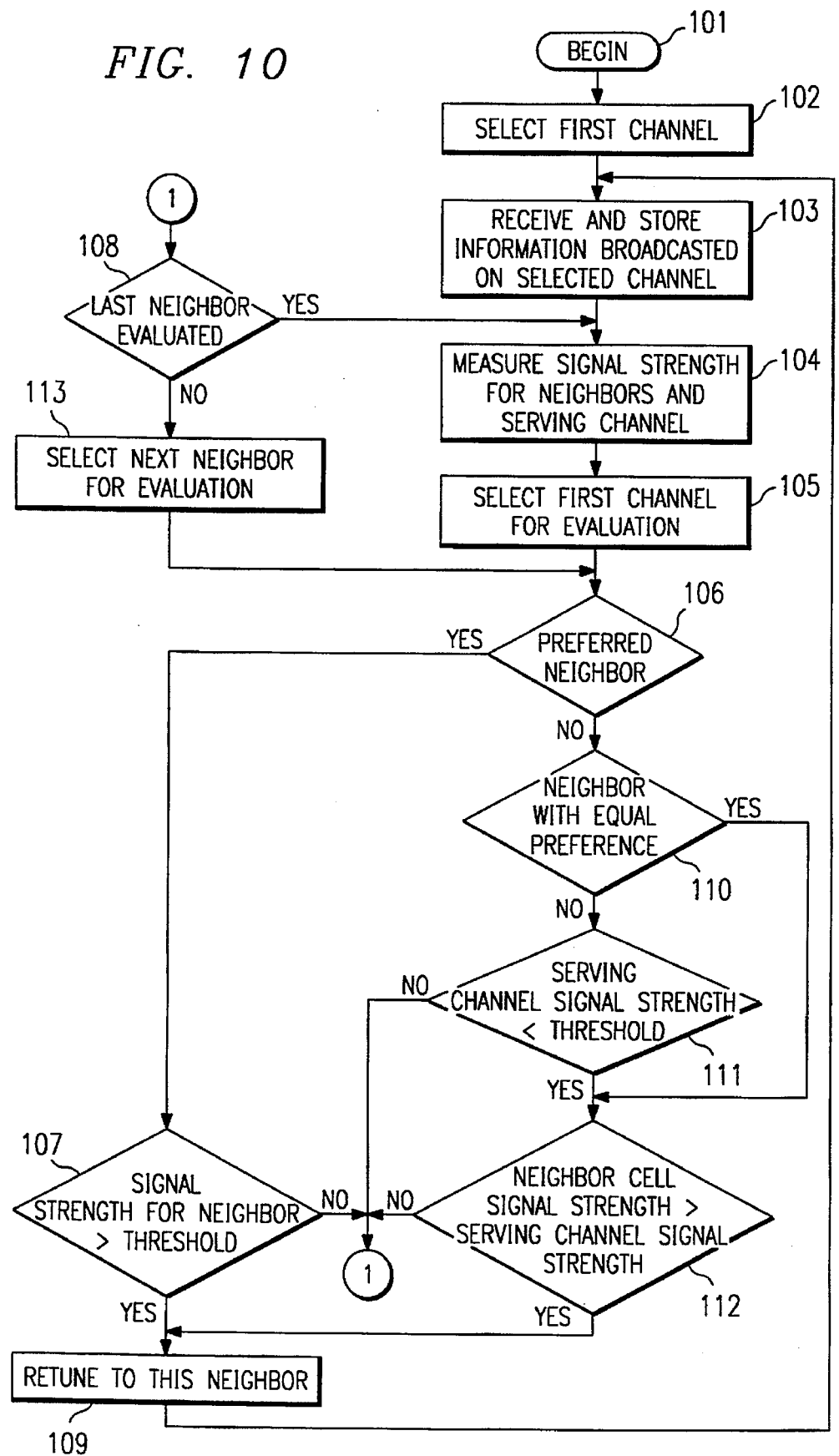
FIGS. 10–12b are flow charts illustrating procedures used in the present invention.

Referring next to FIG. 10, there is shown a flow chart illustrating certain functional performance in the system of the present invention. FIG. 10 illustrates a process performed within the mobile during idle period as follows: the routine begins at 101 and moves to 102 at which it selects a first channel. Thereafter, the mobile moves to 103 where it receives and stores information broadcast on the selected channel. Next, at 104 the mobile station measures the signal strength for the neighboring cells and for the serving channel. Thereafter, at 105 the mobile selects a first channel for evaluation and moves to 106 where it is determined whether or not that channel comes from a preferred neighbor cell. If so, the system moves to 107 at which it is determined whether or not the signal strength for the neighbor cell is greater than a preselected threshold value plus the hysteresis, if any. If not, the system moves to 108 where it is determined whether or not the last neighbor has been evaluated. If, however, at 107, the signal strength for the neighbor cell is greater than the threshold value plus the hysteresis, if any, the system moves to 109 and the mobile station retunes to this neighbor cell value and returns to 103 to receive and store information broadcast on this newly selected channel.

If, however, at 106 the channel being evaluated is determined to not be a preferred neighbor cell, the system moves to 110 where it is determined whether or not the neighbor cell is one with equal preference. If not, i.e., the cell is a non-preferred neighbor cell, the system moves to 111 at which it determines whether or not the serving channel signal strength is less than a preselected threshold value plus the hysteresis, if any. If not, it moves to 108 to determine if the last neighbor has been evaluated. If, at 111, it is determined that the serving channel signal strength is lower than the threshold value minus the hysteresis value, if any, the system moves to 112 where it is determined whether or not the neighbor cell's signal strength is greater than the serving channel's signal strength and, if not, moves to 108 and determines whether or not the last neighbor has been evaluated. If, at 112 the neighbor cell's signal strength is determined to be greater than the serving channel's signal strength, then the mobile station retunes to this neighbor cell at 109 and returns to 103 to receive and store information broadcast on this channel. Similarly, if it is determined at 110 that this neighbor cell is a cell of equal preference, the system moves directly to 112 to evaluate the signal strength of that cell. If, at 108, the system determines that the last neighbor has been evaluated, the system returns to 104 and measures the signal strength for the neighboring cells in the serving channel as set forth above. If, however, the last neighbor cell is determined to have not been evaluated at 108, the system moves to 113 and selects the next neighbor for evaluation returning to 106 to determine the preference of that particular neighbor.

It can thus be seen in FIG. 10 that the mobile station during idle period is continually cycling through the reception of channel information and determining whether or not it is appropriate to be handed off to a cell and applying a preference to those potential cells to which it may be handed off in accordance with the most efficient utilization of channel availability.

It should be understood that the process described above relates to the implementation of the present invention within a digital cellular system employing mobile assisted handoff (MAHO) such as that specified by the IS-54 standard promulgated by EIA/TIA. It should be clear that the invention could also be implemented within other digital or analog cellular systems in which radio signal strength measurements are made by the base stations of the various associated cells.

Figure 11:
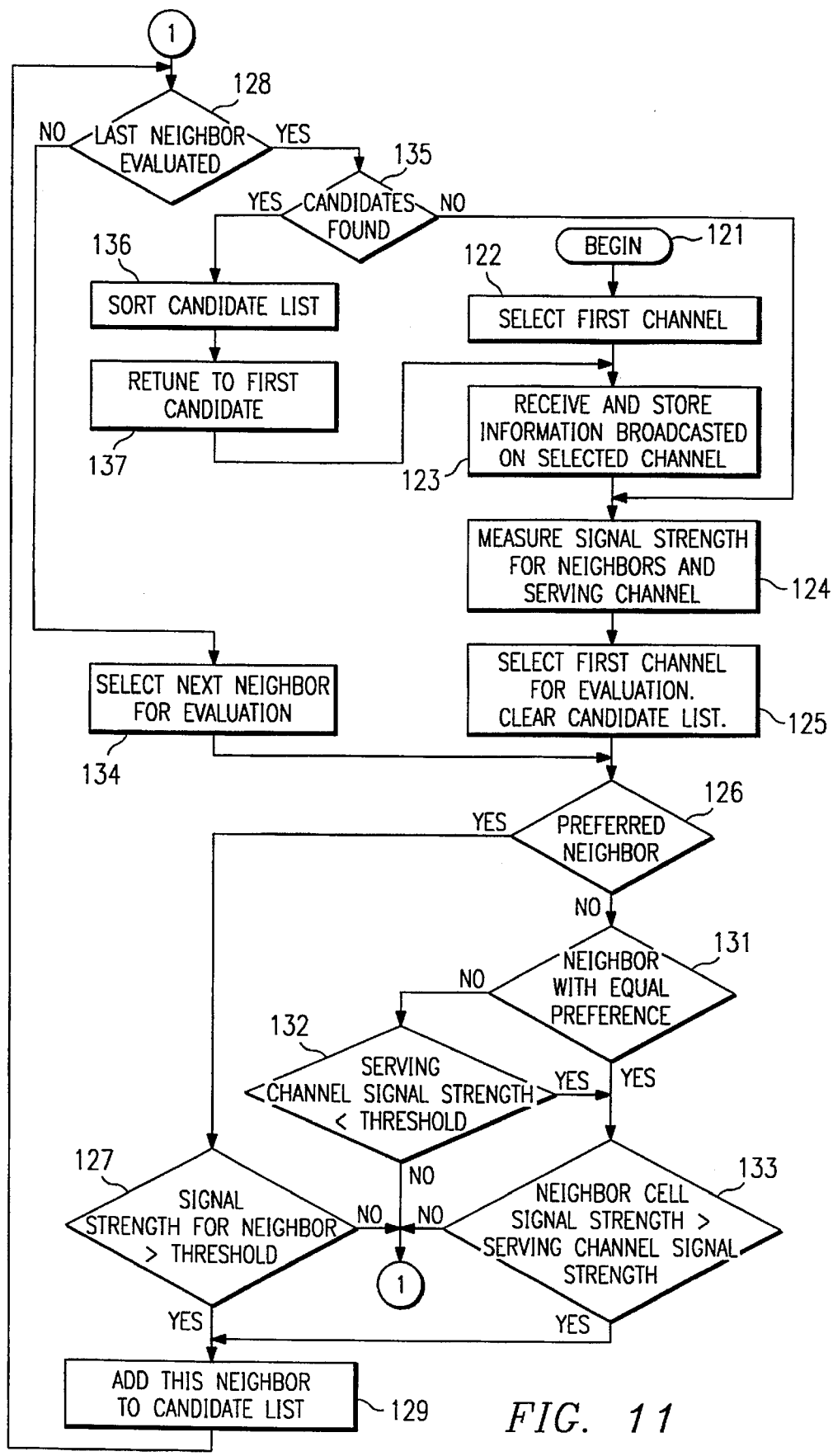

Referring next to FIG. 11, there is also shown an alternate procedure for the evaluation of handoff likelihood in the mobile during an idle period. The routine begins at 121 where the mobile selects a first channel at 122 and moves to 123 where it receives and stores information broadcast on that selected channel. Thereafter, the system moves to 124 and measures signal strength for the neighboring cells and serving channels thereof. Next, at 125 the system selects the first channel for evaluation and clears a candidate channel list. Thereafter, at 126 the system determines whether or not the selected channel is that of a preferred neighbor and, if so, moves to 127 where the signal strength for the neighboring cell is evaluated to determine whether or not it is above a preselected threshold value plus the hysteresis, if any. If not, the system moves to 128 and it is determined whether or not the last neighbor has been evaluated. If, however, at 127, it has been determined that the signal strength for the neighboring cell was greater than the threshold value, the system moves to add this neighbor's cell to the candidate list at 129 and thereafter to decision 128 to evaluate whether or not the last neighbor has been evaluated. If, however, at 126 it is determined that the neighbor was not preferred, the system moves to 131 to determine whether or not the neighboring cell is one with equal preference. If not, i.e., it is a non-preferred neighbor, the system moves to 132 and determines whether or not the serving channel strength is less than a preselected threshold value minus the hysteresis, if any, and, if not, to decision 128 to determine if the last neighbor has been evaluated. If, however, at 132 the serving channel signal strength is determined to be less than a threshold value minus the hysteresis, if any, the system moves to 133 at which it is determined whether or not the neighbor cell signal strength is greater than the serving channel signal strength and, if not, to a decision as to whether or not the last neighbor has been evaluated at 128. If the neighbor cell signal strength is greater than the serving channel signal strength, the system moves to 129 and adds this neighbor to the candidate list. If, at 131 it is determined that the cell is a neighbor with equal preference, the system moves directly to decision 133 to determine if the neighboring cell signal strength is greater than the serving channel signal strength.

If, at decision 128 it is determined that the last neighbor has not been evaluated, the system moves to 134 to select the next neighbor for evaluation and thereafter to decision 126 to begin that evaluation. If the last neighbor has been evaluated at 128, the system moves to 135 and determines whether or not any candidates have been found. If not, the system returns to 124 and, if so, moves to 136 to sort the candidate list. Thereafter, the system moves to 137 and retunes to the first candidate on the list followed by moving to 123 where it receives and stores the information broadcast on that selected channel.

As shown in FIG. 11, again the system engages in an orderly evaluation of possible channels and selects a channel based upon criteria determined to provide maximum efficiency and channel utilization in a multi-layered cell structure.

Figure 12A:
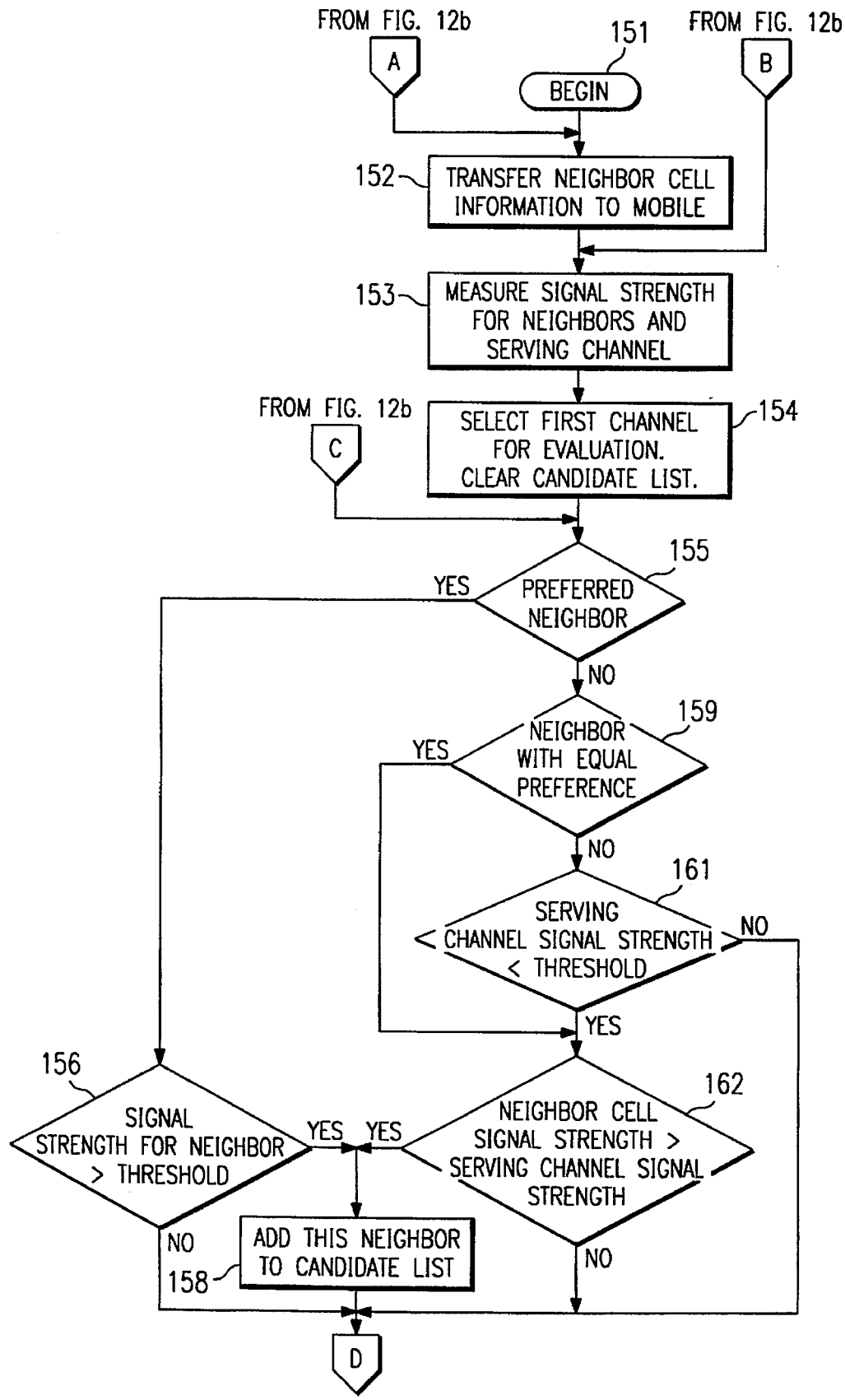
Figure 12B:
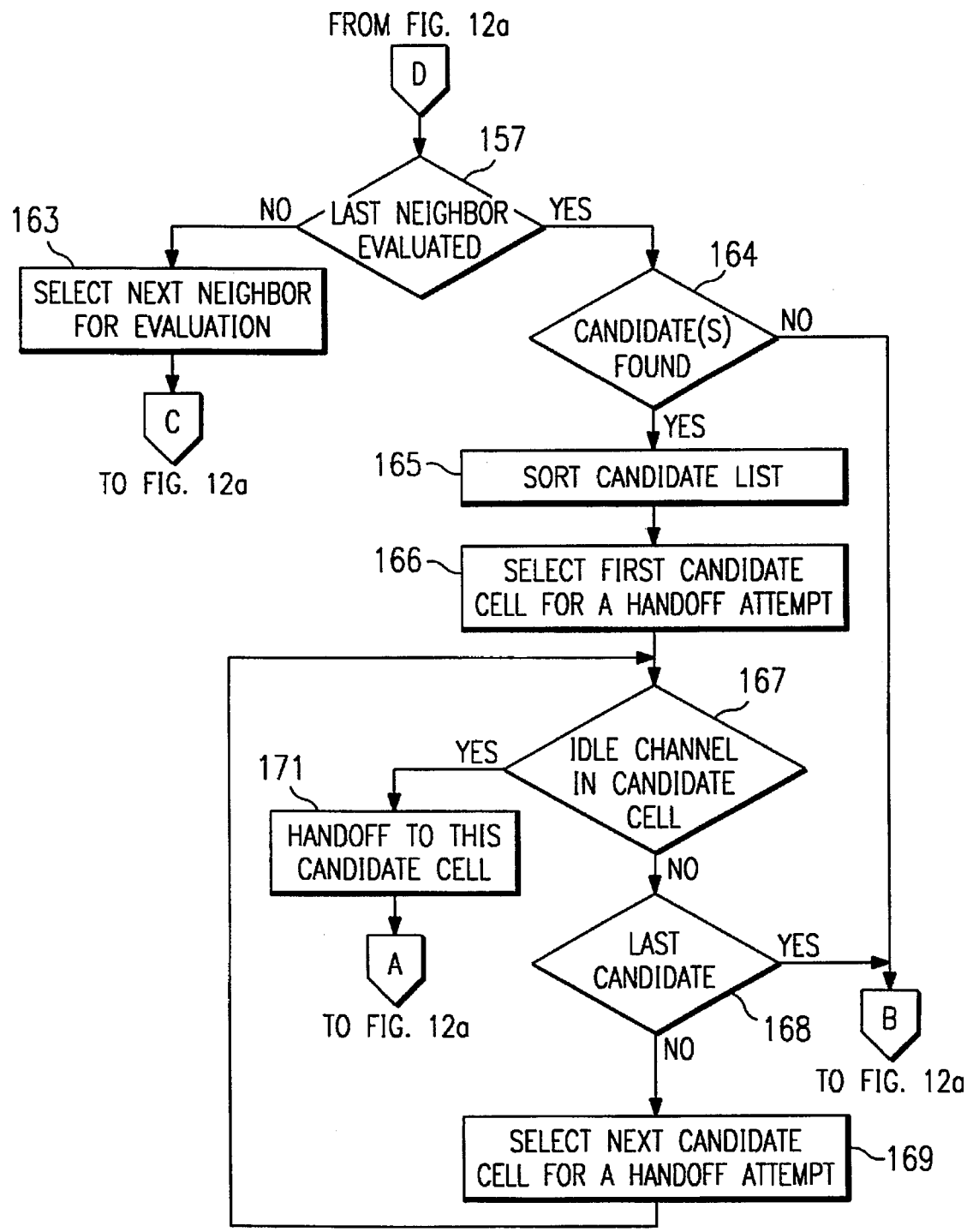

Referring next to FIGS. 12a–12b, there is shown a routine which may be executable in the system by either the mobile station and/or base station during an established call within an exemplary digital cellular system. The system begins at 151 by moving to 152 at which it transfers neighbor cell information from the base station to the mobile. Thereafter, at 153 the system measures the signal strength for the neighboring cells and serving channels. Next, at 154 the system selects a first channel for evaluation and clears a candidate list. Thereafter, at 155 the system determines if the selected channel is from a preferred neighbor cell and, if so, moves to 156 where it determines whether or not the signal strength for that neighbor cell is greater than the preselected threshold value plus the hysteresis, if any. If not, the system moves to 157 and determines if the last neighbor has been evaluated. If, at 156 the signal strength of the neighboring cell is greater than the threshold value plus the hysteresis, if any, the system moves to 158 and adds this neighbor to the candidate list. If, at 155 the cell is determined not to be a preferred neighbor, the system moves to 159 to determine if the neighboring cell is one With equal preference and, if not, to 161 to determine if the serving channel signal strength is less than the preselected value minus the hysteresis, if any. If not, the system moves to 157 to determine if the last neighbor has been evaluated. However, if the signal strength is less than the preselected value at 161, the system moves to 162 where it is determined whether or not the neighboring cell signal strength is greater than a serving channel signal strength plus the hysteresis, if any, and, if so, to 158 to add this neighbor to a candidate list or, if not, to 157 to determine if the last neighbor has been evaluated. If, at 159 it is determined that the neighboring cell is one with equal preference, the system moves directly to 162 to determine if that neighboring cell signal strength is greater than the serving channel signal strength plus the hysteresis, if any.

If it is determined at 157 that the last neighbor has not been evaluated, the system moves to 163 to select the next neighbor for evaluation and thereafter evaluates it beginning at step 155. If, at 157 it is determined that the last neighbor has been evaluated, the system moves to 164 to determine if candidates are found and, if not, back to 153 to measure the signal strength for neighbors and the serving channels. If candidates are found at 164, the system moves to 165 to sort the candidate list and, thereafter to 166 to select a first candidate cell for a handoff attempt. At 167, the system determines whether or not an idle channel exists in the candidate cell and, if not, moves to 168 to determine if this is the last candidate and, if not, to 169 wherein it selects the next candidate cell for a handoff attempt. If the cell was the last candidate at 168, the system moves back to 153 to measure the signal strength for neighbors and serving channels. If the idle channel in the candidate cell exists, the system moves to 171 and hands off to this candidate cell and, thereafter, returns to 152 to transfer neighboring cell information to the mobile.

As can be seen, the system of the present invention utilizes algorithms which maximize the channel utilization from various cells within a multi-layered cell structure in a highly efficient manner.

As can be seen from the above description, the present invention allows a multi-layered cellular communication system to monitor channel signal strength in a plurality of cells on multiple levels and perform an evaluation in accordance with an algorithm which maximizes the channel availability within the multi-layered cellular structure.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method of performing server selection for a mobile station operating within a cellular radio system in a region in which radio channels are provided by cells having different service areas, said method comprising:

providing for the mobile station a list of neighboring cells;

assigning a threshold radio channel signal strength level which is acceptable for service of a mobile station in each of said neighboring cells;

assigning to each of said neighboring cells on said list a category of preference with respect to a currently serving cell;

measuring the strength of the radio signals providing communication between the mobile station and the base station of each of the neighboring cells; and selecting as a server for the mobile station the base station of a neighboring cell on said list whose preference category is preferred with respect to the currently serving cell and whose measured strength of the radio signal providing communication therewith is greater than the assigned threshold radio channel signal strength level by a largest margin in comparison to other preferred neighboring cells.

2. A method of performing server selection as set forth in claim 1 in which the categories of preference assigned within each cell to each neighboring cell includes preferred, equal preference and non-preferred.

3. A method of performing server selection for a mobile station operating within a cellular radio system in a region in which radio channels are provided by multiple levels of cells, each of said cells being provided with radio service by a base station the broadcast power of which and the resultant service area which varies in size from larger for higher level cells to smaller for lower level cells, said method comprising:

providing for the mobile station a list of neighboring cells;

assigning a threshold radio channel signal strength value which is acceptable for service to a mobile station in each of said neighboring cells;

measuring the strength of the radio signals providing communication between the mobile station and the base station of each of the neighboring cells; and selecting as a server for the mobile station from among the neighboring cells the cell having both the smallest relative service area size and a measured radio signal strength which is greater than the threshold radio channel signal strength by a largest margin in comparison to other smallest neighboring cells.

4. A method for control channel reselection in a cellular telephone system including a plurality of cells, the plurality of cells including, with respect to a given cell associated with a currently selected control channel, an identified plurality of neighboring cells each being assigned a signal strength threshold and a category of preference with respect to the given cell, comprising the steps of:

filtering the identified plurality of neighboring cells to determine candidate cells for control channel reselection which have a measured signal strength exceeding their assigned signal strength threshold and have a category of preference of preferred over the given cell; and choosing for control channel reselection the candidate cell whose measured signal strength exceeds its assigned signal strength threshold by a best margin in comparison to other preferred neighboring cells.

5. The method of claim 4 wherein the plurality of cells form a multi-level layered cell structure.

6. The method of claim 5 wherein the multi-level layered cell structure includes both umbrella cells and microcells, and:

wherein a microcell has a category of preference of preferred with respect to an umbrella cell;

wherein an umbrella cell has a category of preference of non-preferred with respect to a microcell;

wherein a microcell has a category of preference of equally preferred with respect to another microcell; and wherein an umbrella cell has a category of preference of equally preferred with respect to another umbrella cell.

7. The method of claim 4 wherein the step of filtering comprises the steps of:

making signal strength measurements on a control channel of each of the identified neighboring cells;

comparing the signal strength measurements to the assigned signal strength thresholds;

determining the category of preference for each of the identified neighboring cells; and selecting as the candidate cells those neighboring cells having measured signal strengths exceeding the signal strength thresholds and having preferred categories of preference.

8. The method of claim 7 wherein the signal strength measurements are made by mobile stations operating within the cellular telephone system.

9. The method of claim 7 wherein the signal strength measurements are made by base stations operating within the cellular telephone system.

10. The method of claim 4 wherein the step of choosing comprises the steps of:

sorting the candidate cells by calculated margin between the measured signal strengths and assigned signal strength thresholds; and selecting for control channel reselection the candidate cell with the best calculated margin.

11. The method of claim 4 wherein the signal strength threshold comprises the sum of a sufficient signal strength for communication in the neighboring cell plus an offset.

12. The method of claim 4 wherein if no neighbor cell with a preferred category of preference is capable of being chosen in control channel reselection by the steps of filtering and choosing, further including the steps of:

further filtering the identified plurality of neighboring cells to determine alternate candidate cells for control channel reselection which have a measured signal strength exceeding a measured signal strength for the given cell by a certain hysteresis and have a category of preference of other than non-preferred with respect to the given cell; and further choosing for control channel reselection the alternate candidate cell whose measured signal strength exceeds the sum of the given cell measured signal strength and the certain hysteresis by a best margin in comparison to other neighboring cells.

13. The method of claim 12 wherein the step of further filtering comprises the steps of:

making signal strength measurements on a control channel of the given cell and each of the identified neighboring cells;

comparing the signal strength measurements for the neighboring cells to the sum of the signal strength measurement for the given cell plus the certain hysteresis;

determining the category of preference for each of the identified neighboring cells; and selecting as the alternate candidate cells those neighboring cells having measured signal strengths exceeding the sum of the given cell measured signal strength and certain hysteresis and having a category of preference other than non-preferred.

14. The method of claim 13 wherein the signal strength measurements are made by mobile stations operating within the cellular telephone system.

15. The method of claim 13 wherein the signal strength measurements are made by base stations operating within the cellular telephone system.

16. The method of claim 12 wherein the step of further choosing comprises the steps of:

sorting the candidate cells by calculated margin between the candidate cell measured signal strengths and the given cell measured signal strength plus the certain hysteresis; and selecting for control channel reselection the candidate cell with the best calculated margin.

17. The method of claim 4 wherein the steps of filtering and choosing are performed in connection with server selection during mobile station camp-on.

18. The method of claim 4 wherein the steps of filtering and choosing are performed in connection with server selection during mobile station handoff.

19. A method for filtering a plurality of neighboring cells to determine candidate cells for control channel reselection in a cellular telephone system, the plurality of neighboring cells each being assigned a signal strength threshold and a category of preference with respect to a given cell associated with a currently selected control channel, comprising the steps of:

measuring received signal strength with respect to each of the identified plurality of neighboring cells;

determining the category of preference with respect to each of the identified plurality of neighboring cells; and identifying as candidate cells for control channel reselection those ones of the identified plurality of neighboring cells which have a measured received signal strength exceeding their assigned signal strength threshold and have a category of preference of preferred over the given cell.

20. The method as in claim 19 further including the steps of:

measuring received signal strength with respect to the given cell; and identifying as alternate candidate cells for control channel reselection those ones of the identified plurality of neighboring cells which have a measured received signal strength exceeding the sum of the measured signal strength for the given cell plus a certain hysteresis and having a category of preference other than non-preferred with respect to the given cell.

* * * * *